G. T. HYLAND.
CHURN.
APPLICATION FILED JULY 2, 1909.

955,074.

Patented Apr. 12, 1910.

Witnesses

Inventor
George T. Hyland
By C. A. Snow & Co.
Attorneys

UNITED STATES PATENT OFFICE.

GEORGE TOLIFARO HYLAND, OF ROUND ROCK, TEXAS.

CHURN.

955,074.  Specification of Letters Patent.  Patented Apr. 12, 1910.

Application filed July 2, 1909. Serial No. 505,717.

*To all whom it may concern:*

Be it known that I, GEORGE T. HYLAND, a citizen of the United States, residing at Round Rock, in the county of Williamson and State of Texas, have invented a new and useful Churn, of which the following is a specification.

It is the object of the present invention to provide an improved device for supporting a churn body in such manner as to permit of its vertical reciprocation, and the invention relates more specifically to that class of such devices which embody heads between which the churn body is clamped, and springs which support the churn-body clamping heads for vertical reciprocation or vibration.

One of the novel features of the invention resides in the specific arrangement of the springs which are connected to the heads between which the churn body is clamped, there being two springs connected to and supporting the upper one of the heads and a single spring connected to the lower one of the heads whereby to steady the heads and the churn body while reciprocating, and to return them after each upward stroke.

Another feature of the invention resides in forming in the upper one of the churn-body clamping heads an air-vent opening, which, when a churn-body is in place between the heads, opens into the churn body and permits of the escape of air from the body, and its entrance thereinto, although it is not sufficiently large to permit of the escape of milk from the body.

Figure 1:
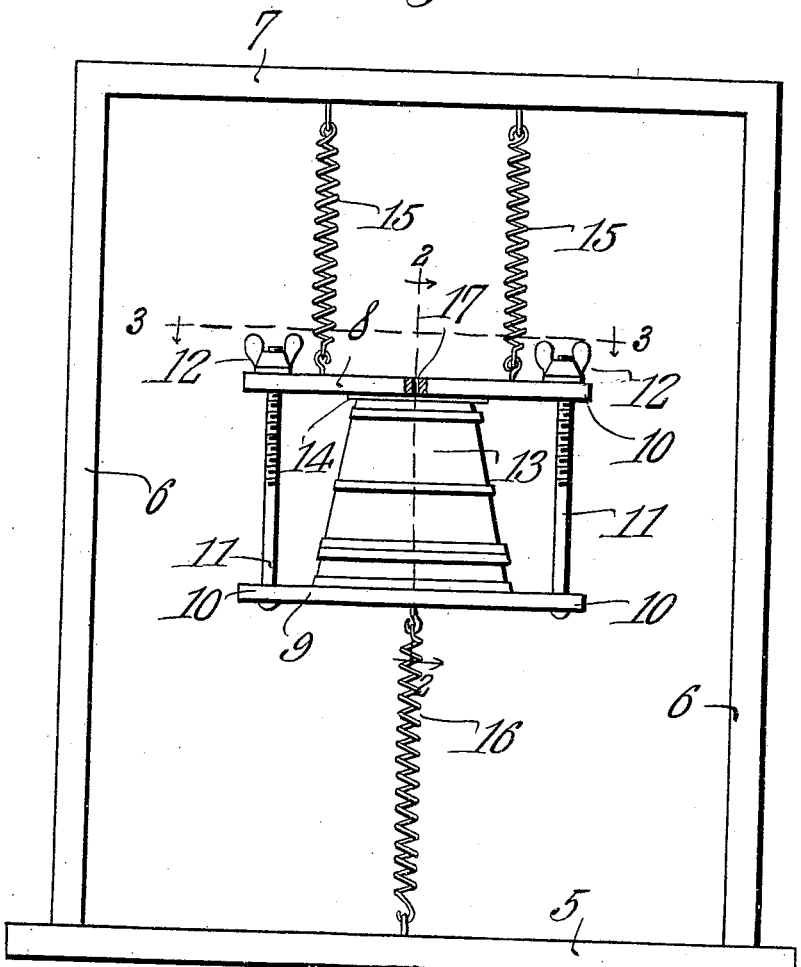
Figures 2, 3:
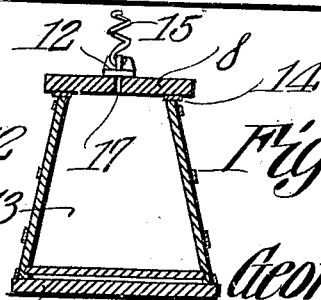

In the accompanying drawings:—Figure 1 is a view, in elevation, of the device embodying the present invention, a churn-body being shown in place therein. Fig. 2 is a vertical sectional view on the line 2—2 of Fig. 1, looking in the direction indicated by the arrows. Fig. 3 is a horizontal sectional view on the line 3—3 of Fig. 1, looking also in the direction of the arrows.

In the drawings, the device embodying the present invention is illustrated as comprised in part of a frame, and this frame includes a base, which is indicated by the numeral 5, uprights 6, which extend vertically above the base in parallel relation, and a top frame-piece 7, which connects the upper ends of the uprights.

As heretofore stated, the device embodying the present invention includes, among other elements, heads between which a churn-body is to be clamped, and of these heads one is indicated by the numeral 8 and the other one is indicated by the numeral 9, the head 8 being the upper one of the two heads, and the head 9 being the lower one. Both of these heads 8 and 9 are oblong; and through the ends 10 of these heads are engaged clamping bolts 11, the heads at the lower ends of the bolts bearing against the under side of the lower head 9 at the ends thereof, and nuts 12 upon the bolts at their upper ends bearing against the upper face of the head 8, as shown in Fig. 1 of the drawings. In mounting a churn-body between these heads 8 and 9, the body is disposed upon the lower head 9, and with its upper end against the under surface of the upper head 8. In order to prevent the leakage of material from the churn-body, which body is indicated by the numeral 13, there is secured upon the under surface of the head 8 a packing ring, which is indicated by the numeral 14, and against which the upper end edge of the churn-body seats.

In order to support the churn-body and the heads between which it is clamped, for vertical reciprocation within the frame before described, there are provided springs which are indicated by the numeral 15, and are secured each at their lower ends to the upper head 8 inwardly of the extremities thereof, and of the points of engagement of the bolts 11 therethrough, and at their upper end to the top-piece 7 of the frame of the device. A spring 16, provided for the purpose of holding the churn-body against swinging to any considerable degree from side to side, or from front to rear, is connected at its upper end to the lower head 9 at a point midway of the ends thereof, and at its lower end to the base 5 of the frame.

From the foregoing description of the invention it will be readily understood that by placing the hands upon either of the heads 8 or 9, or by grasping the bolts 11 at points between these heads, the heads, together with the churn-body clamped therebetween, may be reciprocated or vibrated in a vertical plane, downward pressure or force upon the heads and the churn-body clamped between them expanding the springs 15 and release of the bolts or the heads permitting of contraction of these springs, whereby to spring the heads and churn body upwardly, this upward movement being arrested however by the expansion of the spring 16, against the tension of which such upward movement is had, and this spring 16 serving, to a certain degree, to pull down or return the heads and churn body after being moved vertically by the springs 15. It will be observed, from inspection of the several figures of the drawings, that the upper one of the heads, indicated by the numeral 8, is formed centrally with an air-vent opening, and this opening is indicated by the numeral 17, and is provided for the escape or entrance of air from and into the churn, although it will be understood that the opening is not of sufficient size to admit of leakage of the material from the churn-body.

What is claimed is:—

1. In a device of the class described, a frame, heads between which a churn body is to be clamped, springs connected at their lower ends to the upper one of the heads, one adjacent each end thereof, and at their upper ends to the frame, and a spring connected at its upper end to the lower one of the heads midway of its ends, and at its lower end to the frame.

2. In a device of the class described, a frame, heads between which a churn body is to be clamped, springs connected at their lower ends to the upper one of the heads, one adjacent each end thereof, and at their upper ends to the frame, a spring connected at its upper end to the lower one of the heads, midway of its ends, and at its lower end to the frame, the upper one of the heads being formed midway of its ends with an air-vent opening.

In testimony that I claim the foregoing as my own, I have hereto affixed my signature in the presence of two witnesses.

GEORGE TOLIFARO HYLAND.

Witnesses:
H. L. STOCKBRIDGE,
N. S. WEBSTER.